|  | United States Patent [19] | [11] | Patent Number: | 4,787,988 |
|---|---|---|---|---|
|  | Bertoncini et al. | [45] | Date of Patent: | Nov. 29, 1988 |

[54] CELL HARVESTER

[75] Inventors: Joseph Bertoncini, Gaithersburg; William J. Kinnier, Timmonium, both of Md.

[73] Assignee: Biomedical Research and Development Laboratories, Inc., Gaithersburg, Md.

[21] Appl. No.: 17,095

[22] Filed: Feb. 20, 1987

[51] Int. Cl.$^4$ .......................................... B01D 29/00
[52] U.S. Cl. ................. 210/808; 210/406; 210/416.1; 210/455; 210/456; 422/101; 435/311; 435/313; 435/296; 436/177
[58] Field of Search ............ 210/790, 808, 232, 323.1, 210/406, 455, 456, 247, 416.1; 422/101; 436/177; 435/284, 286, 287, 296, 311, 313

[56] References Cited

U.S. PATENT DOCUMENTS

| 3,319,792 | 5/1967 | Leder et al. | 210/323.1 X |
|---|---|---|---|
| 3,730,352 | 5/1973 | Cohen et al. | 210/406 X |
| 4,090,850 | 5/1978 | Chen et al. | 422/102 |
| 4,167,875 | 9/1979 | Meakin | 436/177 X |
| 4,245,042 | 1/1981 | Weinstein et al. | 422/101 X |
| 4,415,449 | 11/1983 | Hein | 210/406 |
| 4,427,415 | 1/1984 | Cleveland | 210/455 X |
| 4,493,815 | 1/1985 | Fernwood et al. | 422/101 |

Primary Examiner—Richard V. Fisher
Assistant Examiner—W. Gary Jones
Attorney, Agent, or Firm—Breneman & Georges

[57] ABSTRACT

A method and apparatus for the simultaneous filtering of samples contained in a plurality of test tubes includes a test tube block, a vacuum manifold, base manifold and vacuum base. The vacuum manifold is provided with a plurality of recesses complementary with barrels in the block defining chambers to receive the test tubes. The base manifold and vacuum base are assembled as a unit including recesses to receive filter screens and passages leading from the recesses to a vacuum source. The vacuum manifold is positioned onto the block with a filter medium placed over the vacuum manifold and secured in place by attaching the base manifold-/vacuum base unit to the block. When vacuum is applied to the vacuum base the entire assembly is inverted whereby the contents of the test tubes are drawn through passages in the vacuum base to the filter medium. Passages in the base provide a wash solution to the barrels which is drawn through the device by the vacuum. In the recesses of the vacuum manifold, a deflector is provided to direct a portion of the wash back up into the test tube to remove any residue and deposit it onto the filter medium. The recesses in the base manifold act as a die which cut circular filter elements from the filter medium when sufficient pressure is used to clamp the components to the block. Upon disassembly of the components the contents of each test tube are contained on the individually cut filter elements to allow easy separation and handling.

28 Claims, 3 Drawing Sheets

CELL HARVESTER

BACKGROUND OF THE INVENTION

1. Field Of The Invention

The present invention relates to a novel cell harvester providing for the rapid separation of solids from a carrier fluid without contamination in biochemical testing and screening. More particularly, the invention pertains to a method and apparatus for the rapid and simultaneous separation of chemical components such as for example the separation of bound ligand receptor complexes from the free ligand without contamination from a group of ordinary laboratory test tubes. The cell harvester is capable of simultaneously filtering a number of samples onto defined areas of a single sheet of filter medium without risk of contamination from outside sources or infiltration from one sample to another.

2. Description of the Prior Art

The measurement of various body constituents by the use of radio receptors and radioimmunoassays has in recent years achieved widespread acceptance. Some of the research in diagnostic uses include drug screening, basic research into receptor functions, measurement of aldosterone, angiotensin, hepatitis B antigen, insulin, thyroid stimulating hormone and vitamin B 12.

Radioimmunoassay procedures require a suitable separation technique in order to recover the bound component from the free labeled tracer material. The procedures used for separation have varied widely and have included developments in electrophoresis, chromatography, ion exchange, absorption to dextran coated charcoal, talc or cellulose and a number of solid phase antibody separation techniques.

A few of the widely accepted and utilized practices of solid phase separation for a radioimmunoassay include the covalent bonding of an antibody to an insoluble polymeric material and the physical adsorption of an antibody onto an insoluble polymeric substrate. The resulting product of such separation procedures is a residue of solid matter which may be subjected to further reactions or further analysis such as microscopy, radioisotope detection or spectrophotometry.

Solid phase antibody separation techniques have the distinct advantage of ease and convenience by allowing the separation and isolation of the bound ligand from the free labeled tracer material by a simple washing procedure at the completion of the immune reaction. In practice however this washing stage of the prior art has required several time consuming and repetitive steps by the laboratory technician due to the often large number of samples which must be sequentially tested and analyzed. These traditional washing techniques create a significant risk of contamination thereby increasing the cost and impeding and compromising the progress of the research.

In general, analytical and quantitative testing of particulate biochemical substances are carried out in ordinary laboratory test tubes, vials or other commercially available containers which are collected in an array. Many of the prior art techniques of separation of the desirable constituents utilizes filter arrangements which require the technician to pour or otherwise individually transfer a large collection of samples from the test tubes to the various wells of a specially designed filtering apparatus. Examples of such prior art filtering devices and procedures are disclosed in Cleveland U.S. Pat. Nos. 4,427,415 and Fernwood 4,493,815.

U.S. Pat. Nos. 4,427,415 and 4,493,815 pertain to vacuum assisted filter systems for the simultaneous separation of a number of biochemical samples. These devices in some cases employ a single sheet of a filter medium clamped between a pair of plates having a plurality of cooperating apertures or passages identifying a collection area on the filter. The upper plate is provided with a plurality of sample wells to form a grid like structure. In operation the individual samples are sequentially introduced into each of the wells from the test tubes and a vacuum is applied to the lower face of the bottom plate to draw the carrier fluid through the device thereby depositing the desired residue on the filter element. This arrangement requires tedious and time consuming procedures to transfer each of the many samples individually to the sample wells of the filter device thereby increasing the risk of incorrectly labeling the filtered samples and contamination from outside sources as well as encroachment of samples from one collection area on the filter to another.

Another form of the prior art filtering devices is disclosed in Chen U.S. Pat. Nos. 4,090,850 and Leder 3,319,792 pertaining to the use of individual filtering elements such as an antibody coated cellulose placed into a plurality of separable wells cooperating with a receiving structure. After the samples are manually added individually to each of the wells a vacuum is applied to the receiving structure to draw the sample through the filter. This prior art arrangement also suffers from the distinct disadvantage of requiring tedious and time consuming procedures in positioning individual filter papers in each of the numerous wells and transferring each sample to the sample well in a singular fashion thereby increasing the risk of contamination of the samples.

A further type of device is disclosed in Hein U.S. Pat. No. 4,415,449 relating to a bench supporting a number of conventional filter flasks and filter devices. This arrangement is generally not suitable for biochemical filtering and particularly radio-immunoassay testing procedures due to the risk of contamination and time consuming operation.

Another form of prior art biochemical filtering device is disclosed in Meakin, U.S. Pat. No. 4,167,875, where a filter housing is defined by a sample well, a filter manifold and a cutting block. The cutting block is provided with projections such that when clamped to the filter manifold a single sheet of filter medium is cut into circular shaped elements corresponding to the filtering wells. A conduit extends from the filter housing to the sample tray such that when a vacuum is applied to the filter housing the sample fluid is drawn upward through the conduit and through the filter element. This arrangement is relatively complex and elaborate in providing conduits to draw the sample from the wells to the filter and the means for feeding, positioning and cutting the filter medium. The speed and number of samples which can be filtered at one time are limited since in order to proceed to the next set of samples it is necessary to reposition the assembly, remove the filter elements and feed new filter material to the filter assembly. Moreover, the arrangement does not provide a closed filtering assembly which will ensure accurate and uncontaminated results.

A further example of the prior art filtering devices is disclosed in Weinstein U.S. Pat. No. 4,245,042. This device pertains to harvesting cells from a plurality of wells of a standard culture plate utilizing an upper block housing a vacuum conduit and a lower block housing a washing fluid conduit. The upper and lower blocks are adapted to be attached together thereby sandwiching a filter element in between. A number of tubes are provided extending downwardly from both the vacuum and wash conduits which are to be inserted into the sample wells. In operation a sample fluid is drawn from the wells by a vacuum upwardly through the filter element. The numerous conduits and tubes required to draw the sample from the culture plate and the necessity of carefully assembling the unit to insure proper positioning of the tubes in the wells to avoid contamination of the samples result in an arrangement which is fairly complex to effectively operate and expensive to produce.

All of the above described filtering devices require time consuming operations in preparing and setting up the filter operation. Additionally some of the devices require extensive manual transfer of the various samples to the wells of the filter arrangement thereby increasing the time required for effective testing and creating a greater risk of error and contamination of the samples. The prior art devices that have sought to reduce the amount of manual labor and handling of samples have resulted in complex and relatively expensive components which have not guaranteed consistent and accurate results for application to state of the art radioimmunoassay and biochemical separation requirements. The demands of modern radioimmunoassay and biochemical separations and isolation procedures have developed a requirement for a filtering device which is inexpensive and easy to operate and is able to provide rapid testing and simultaneous separation of a large number of samples while maintaining accuracy and achieving reliable results. There is further a need for a filtering device which is able to utilize a single sheet of filter material which is quick and easy to handle in the laboratory and in the field that does not require expensive machining or molding operations during manufacturing of the filtering device and which will insure complete separation of the samples.

The present invention is directed primarily to a cell harvester and a method of filtering particularly useful for radioimmunoassays and biochemicals not only in the laboratory environment but also in the field. The demands of biochemistry have required a compact unit suitable for application at the situs of the testing for which the invention is portable, easy to use and of a compact and rugged construction. The filtering device unlike the prior art is relatively inexpensive to manufacture and easy to operate, resulting in effective and rapid separation of bound ligand receptor complexes from the free ligand for use in both the laboratory and in remote locations in the field. In addition, the device according to the present invention is able to use a single flat sheet of filter material to simultaneously collect the residue from a number of samples without risk of contaminating the individual samples.

SUMMARY OF THE INVENTION

The disadvantages and limitations of the prior art methods and apparatus for filtering and harvesting cells are obviated while providing for the rapid and inexpensive filtering and identification of a plurality of samples to recover the solids suspended in a carrier fluid. The invention is of rugged construction, compact, utilizes ordinary test tubes and is equally adaptable to the laboratory or field applications.

The present apparatus provides an arrangement of components to conveniently and rapidly filter and separate the contents of a number of ordinary laboratory test tubes containing test samples without the need to transfer the samples from the test tubes to the filter apparatus thereby reducing the risk of error. The invention utilizes a rugged container forming a rack-like member having a plurality of vertical barrels adapted to receive a single ordinary laboratory test tube distanced and isolated from each other to prevent contamination and infiltration. A passage is provided at the bottom of each barrel to communicate with a conduit within a base which is attached to the bottom of the block. Air or a wash solution is selectively supplied to the conduit in the base which then flows through the passage leading to the barrel and around the test tubes as will be described hereafter in greater detail.

A first manifold, which forms a vacuum manifold, cooperates with the upper surface of the block and includes a plurality of downwardly facing recesses which complement the barrels in the block. The recesses are preferably annular, coaxially situated with the barrels in the block, and have vertical sides and a conical shaped bottom. From the apex of the conical shaped bottom is a passage which extends upward to the upper surface of the manifold. In the preferred embodiment of the invention the conical bottom of the recess is provided with a deflecting arrangement for the fluid which comprises a pair of opposing depressions as will be described in greater detail. A suitable gasket surrounds each recess to seal the vacuum manifold against the uppe surface of the block to form a chamber defined by the barrel and the recess. A second manifold complementary to the first manifold is comprised of a vacuum base and a base manifold secured together to function as a single component. The vacuum base includes a channel or conduit adjacent the base manifold and an external connection to be attached to a vacuum source. On the lower face of the base manifold opposing the vacuum manifold and the filter medium is provided a plurality of recesses cooperating with the passages extending upwardly through the vacuum manifold. In the base manifold a second passage extends from the bottom of each recess therein to the channel in the vacuum base to provide a vacuum to one face of a filter medium sandwiched between the upper surface of the vacuum manifold and the lower surface of a second manifold.

The recesses in the base manifold are annular shaped and are of a size adapted to receive a suitable filter screen which supports the filter medium during filtering. A gasket is received in an annular groove which surrounds each passage in the upper surface of the vacuum manifold to form a tight seal between the vacuum manifold and the base manifold and to define a filter area on the filter medium when the manifolds are clamped to the base. These gaskets positioned between the manifolds provide complete separation of the fluids within the test tube and isolation of the collected samples on the filter medium without risk of contamination.

In operation samples contained in ordinary laboratory test tubes are disposed in the barrels of the block. The vacuum manifold and the base vacuum base manifold unit are assembled together with a single sheet of filter material disposed between them which assembly is then secured to the block containing the ordinary laboratory test tubes by one or more clamps. The elements are then clamped together to force the gasket on the upper surface of the vacuum manifold opposing the filter element to urge the filter paper or medium against the lip of the recess in the base manifold. The lip of the recess acts as a die to cut the filter paper or medium into a plurality of circular filter elements corresponding to the size of the recess in the base manifold.

In the course of the filtering stage the vacuum base is connected to a vacuum source and the entire assembly is inverted at which time the contents of each test tube initially flows downward by gravity to the recess and through the passage in the vacuum manifold. The vacuum then draws the carrie fluid through the filter with the solids being deposited on the filter element. As the vacuum continues the entire liquid contents of the test tubes are drawn through the filter, drawing in air through the channel in the base. The flow of air continues through the passage in the bottom of the barrel and flows around the test tube and through the filter element.

A wash solution may be supplied to the channel in the base which flows through to the barrels in the block and is drawn downwardly by the vacuum around the outside of the test tube to the conical shaped bottom of the recess in the vacuum manifold. There the wash solution flows over the depressions in the recess with sufficient force to force the wash solution back up into the test tube to wash the remaining residue from the walls of the test tube. The wash carrying the residue is then drawn through the passage in the vacuum manifold and through the filter element.

Upon completion of the filtering process the vacuum source is disconnected and the assembly is uprighted and disassembled. When disassembled the circular filter elements are retained in the recesses of the base manifold against the filter screen to provide an improved system for handling, identifying and separating the samples to reduce the risk of contamination of the collected samples. The individual filter elements can then be removed as desired for further purification, treatment or analysis and catalogued by indicia appearing on the lower face of the vacuum manifold.

DETAILED DESCRIPTION OF THE INVENTION

The present invention is directed to a novel cell harvester and method for the vacuum filtration of individual samples from ordinary laboratory test tubes for the separation of solids from a carrier fluid. The invention has been found particularly useful in the laboratory and in the field for harvesting cells and recovering bound ligand receptor complexes and other biochemical substituents without contamination and infiltration. More specifically the invention is directed to a vacuum filter assembly which is capable of receiving a large number of samples and simultaneously recovering the solids from the carrier fluid without risk of contamination of the individual samples or the filtrate. The invention is particularly advantageous in the laboratory and in remote and primitive locations for cell harvesting and chemical analysis since the universally used laboratory test tube is accepted in the sophisticated cell harvester of the invention.

Figure 1:
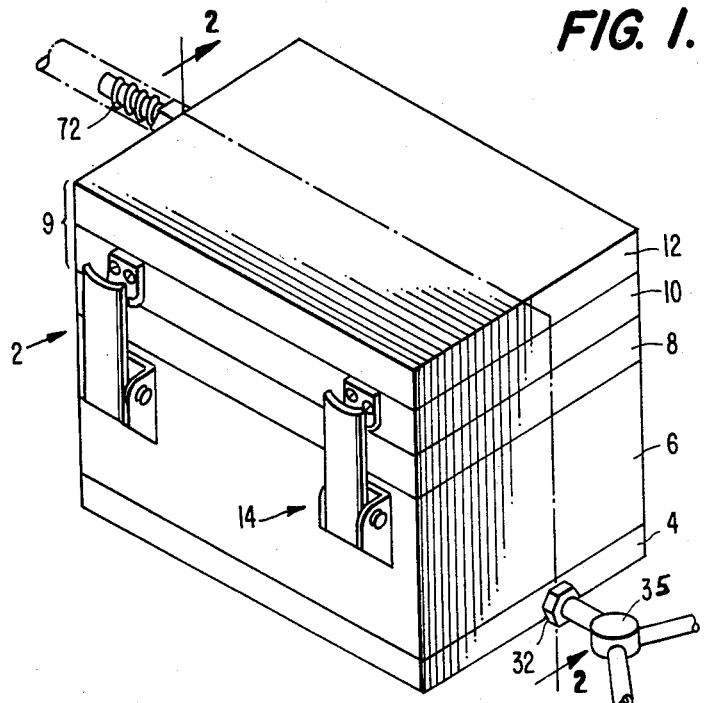
FIG. 1 is a perspective view of a cell harvester constructed in accordance with the preferred embodiment of the invention.

Referring to FIG. 1 the novel cell harvester is illustrated having a combination of components generally represented by the reference numeral 2. The novel cell harvester 2 includes a test tube support block or rack-like member 6 having a base 4 which receives a first manifold comprising a vacuum manifold 8 and a second manifold 9. The second manifold is comprised of a base manifold 10 and a vacuum base 12. A suitable clamping arrangement 14 is provided to secure the second manifold 9 and the vacuum manifold 8 to the test tube block 6.

Figure 2:
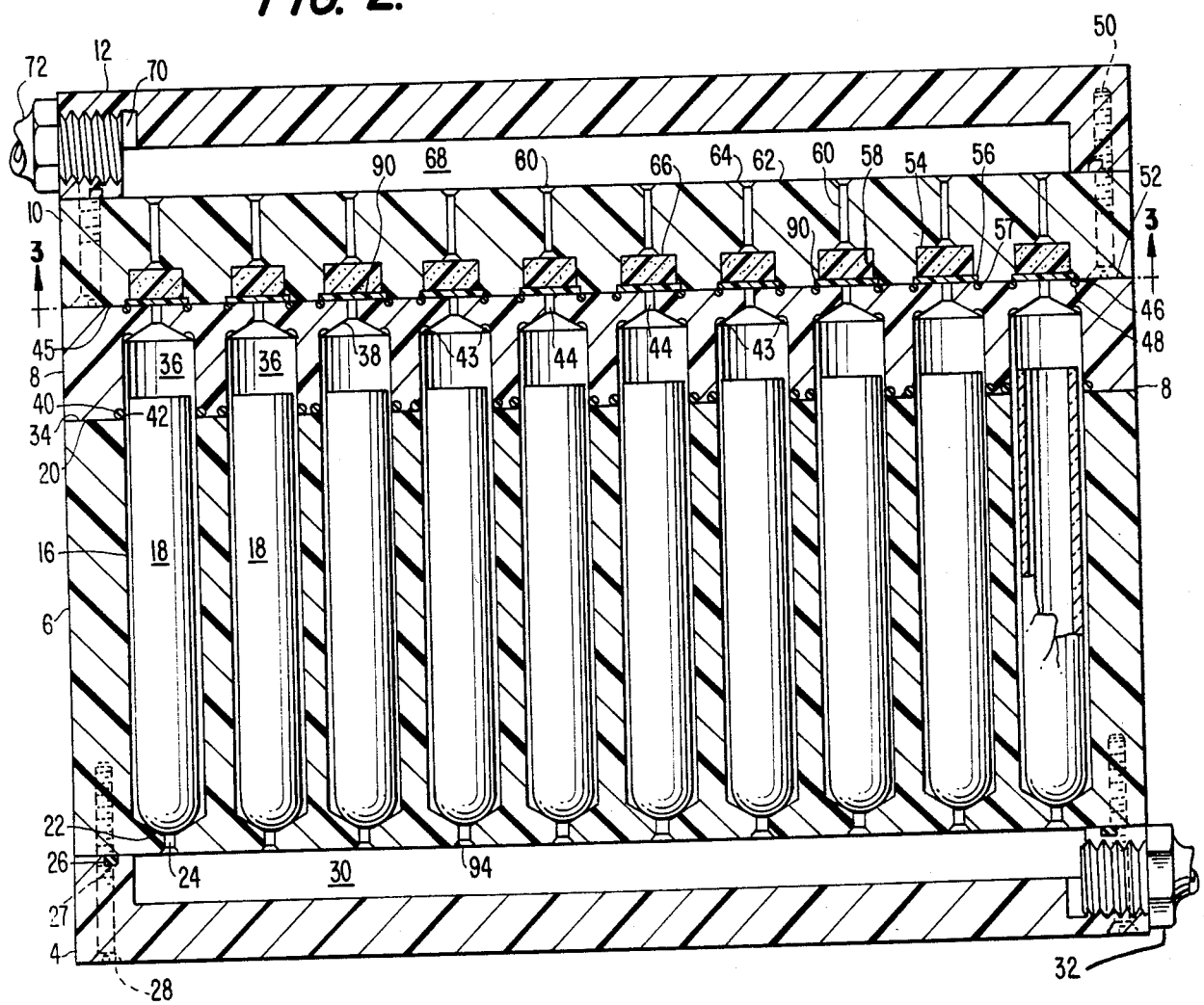
FIG. 2 is a cross sectional view of the preferred embodiment taken along line 2—2 of FIG. 1.

In the preferred embodiment, as best illustrated in FIG. 2, the test tube block 6 includes a plurality of bores or barrels 16 which are adapted to receive ordinary laboratory test tubes or culture tubes 18 containing a sample to be filtered. In the preferred embodiment such barrels 16 are disposed in the block 6 consisting of five rows and ten columns.

The dimensions of the barrels 16 correspond to a standard size of ordinary laboratory test tube commonly employed throughout the world for biochemical and chemical testing and screening. In such operations the test tubes fit loosely within the barrel like an ordinary laboratory test tube rack with the upper edge of the test tube being essentially flush with the block 6 or as show in FIG. 2 slightly above the top surface 20 of the block 6. The size of the barrels and block, however, may be formed of any size to accomodate any size test tube that is nonstandard depending on the use of the apparatus without departing from the invention.

The bottom of the barrel is chamfered to provide a conical surface 22 inclined downwardly as shown in FIG. 2. At the apex of the bottom conical surface a passage 24 extends from the barrel 16 through the bottom of the block 6 to supply air or a wash solution as described hereafter.

The base 4 is secured to the bottom of the block 6 by any suitable means such as screws 28 as shown in FIG. 2. The base 4 is provided with a cavity or channel 30 which communicates with the passages 24 leading to the barrels 16. A continuous gasket member 26 is disposed in a groove 27 encircling the channel 30 to provide a seal between the base 4 and the block 6. An inlet 32 which may include a standard nipple connection extends through the side of the base 4 to the channel 30. In the preferred embodiment a conduit extends from the inlet 32 to a three way valve 35 as shown in FIG. 1. Depending upon the position of the valve 35 diverse fluids such as liquids or gasses can be introduced to the channel 30 and barrels 16 as described hereafter in detail.

The lower face 34 of the vacuum manifold 8 as shown in FIG. 2 includes a plurality of bullet shaped recesses 36 complementary with the barrels 16 of block 6. The recesses 36 are essentially the same diameter as the barrels 16 and include a chamfered conical shaped bottom 38. An annular shelf or lip 40 surrounds the recess 36 and is adapted to receive a suitable gasket or O-ring member 42. The size of the O-ring and the lip 40 are coordinated such that the depth of the lip 40 is approximately one half or slightly greater than the thickness of the O-ring and the inner diameter of the O-ring 42 is essentially equal to the diameter of the recess 36 and the barrel 16. The O-ring 42 provides a tight seal between the vacuum manifold 8 and the test tube block 6 with the test tube 18 being able to slide freely within the chamber defined by the barrel 16 and the recess 36.

In the preferred embodiment the conical shaped bottom 38 of the recess 36 includes a pair of opposing depressions 43 for directing a flow of wash solution into the test tube. Alternatively, the vertical walls of the recess 36 and the conical shaped bottom 38 may include a pair of opposing grooves extending the length of the wall and approximately halfway toward the apex of the conical shaped bottom 38. The opposing depressions 43 are preferred due to the simplicity of manufacture and effectiveness.

A passage 44 extends vertically from the apex of the conical shaped bottom 38 of each recess 36 to the upper surface 45 of the vacuum manifold 8. On the upper surface 45 of the vacuum manifold 8 is provided a plurality of annular grooves 46 which encircle the passages 44. Received within the annular grooves 46 are gaskets or O-rings 48 to provide an effective seal against the base manifold 10.

The second manifold 9 (FIG. 1) is comprised of the base manifold 10 and the vacuum base 12 which are attached together by any suitable means such as for example screws 50. The lower surface 52 of the base manifold 10 includes a plurality of annular recesses 54 having a shelf or lip member 56 aligned with the passage 44 of the recess 36 in the vacuum manifold 8. The recess 54 in the base manifold 10 is adapted to receive a standard porous filter screen member 58. The shelf 56 is provided to receive a filter element as will be described hereafter in greater detail. A passage 60 extends from the recess 54 to the upper surface 62 of the base manifold 10. In the preferred embodiment each passage 60 is provided with a chamfered edge 64 at the upper surface 62 and a chamfered edge 66 adjacent the recess 54.

The vacuum base 12 includes a cavity or channel 68 in communication with the passages 60 and a gasket 67 received in a groove to form a seal between the vacuum base 12 and the base manifold 10. An outlet 70 leads from the channel 68 to a standard nipple connection 72 which is connected to a suitable vacuum source.

Figure 4:
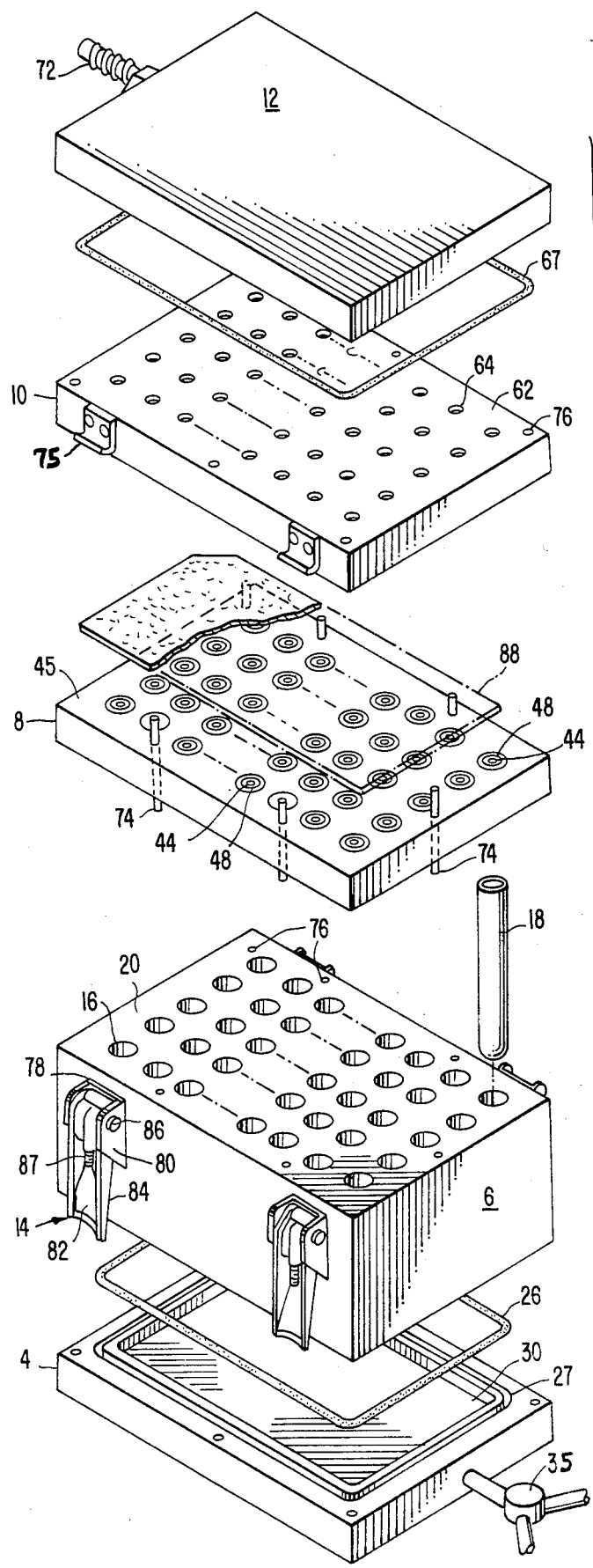
FIG. 4 is an exploded perspective view of the cell harvester constructed in accordance with the invention.

Vacuum manifold 8 as shown in FIG. 4 includes a series of guide pins 74 extending through the upper surface 45 and lower surface 34. The guide pins are received in apertures 76 in the test tube block 6 and in the base manifold 10 to insure proper positioning of the components and alignment of the barrel 16, the recess 36 and the passage 60.

The latching device 14 to secure the components together includes a strike element 75 attached to the base manifold 10. As illustrated in FIG. 4 the latching device 14 of the preferred embodiment is adjustable and comprise essentially an over center or cam type latching device. The latching device includes a base portion 78 having upturned ears 80 and is attached to the test tube block 6. A hooklike member 82 is pivotally mounted to a lever arm 84 which is pivotally mounted at 86 to the ears 80.

The hooklike member 82 includes a threaded portion 87 to enable the adjustment of its length thereby insuring a tight clamping arrangement of the assembled components and proper die cutting of the filter paper. The axis of the pivot point of the hook 82 and lever arm 84 are displaced from one another such that when the lever arm 84 is pivoted upward the hook is pulled downward thereby tightening the base manifold against the vacuum manifold and test tube block 6. While the preferred embodiment includes an over center type clamping arrangement, any device capable of securing the components together may be used.

The porous filter screen 58 may be made of any commonly used materials which are nonreactive with the materials being filtered and as shown in FIG. 2 is a cylindrical member which fits snuggly within the recess 54. The height of the filter screen 58 is such that when positioned within the recess 54 the outer face of the filter screen is flush with the lower edge of the lip 56.

In operation a number of ordinary laboratory test tubes containing the prepared samples, for example bound ligand receptors, cell cultures and the like are placed in the barrels 16 of the block 6. The vacuum manifold 8 is subsequently positioned over the block 6 and properly aligned by the guide pins 74. A single sheet of filter paper 88 is placed over the upper surface 45 of the vacuum manifold insuring that each O-ring 48 and passage 44 are covered. The base manifold 10 and the vacuum base 12 are then positioned over the filter medium and the vacuum manifold and clamped to the block 6 by the latch 14.

The components are clamped together with sufficient force to insure a tight seal of the O-rings 42 and 48 against the upper surface 20 of the block 6 and the lower surface 52 of the base manifold respectively. When clamped together the O-ring 48 abuts the edge 57 of the lip 56 in the base manifold 10 such that edge 57 acts as a die which cuts a circular shaped filter element 90 from the sheet of filter paper. The cut circular filter element 90 is urged into the recesses 54 and supported on the filter screen 58 and the shelf 56. During the filtering operation the 0-rings also serve to retain the cut or scored filter element in place by clamping it against the edge of the shelf 56. The portions of the filter medium 88 between the plurality of cut circular filter element 90 are compressed between the base manifold and the vacuum manifold where they remain until completion of the filtering process and disassembly of the apparatus.

To provide proper placement of the filter medium on the vacuum manifold the filter paper or medium is of a size which fits within the confines of the guide pins 74. In an alternative embodiment the filter medium may be essentially the size of the vacuum manifold and provided with aperture to receive the guide pins. This embodiment provides proper alignment of the filter and prevents movement during the clamping step.

In the preferred form of the invention the filter medium is essentially a flat sheet of a suitable material which is able to withstand the stresses of a vacuum filtering device and is able to be easily cut or scored by the edge 57 of lip 56 into the individual filter elements. The filter may be manufactured from any suitable material for example, cotton, cellulose, glass fibers, polyester fibers, etc. The material ultimately used will depend on the intended use and the types of materials being filtered.

Figure 5:
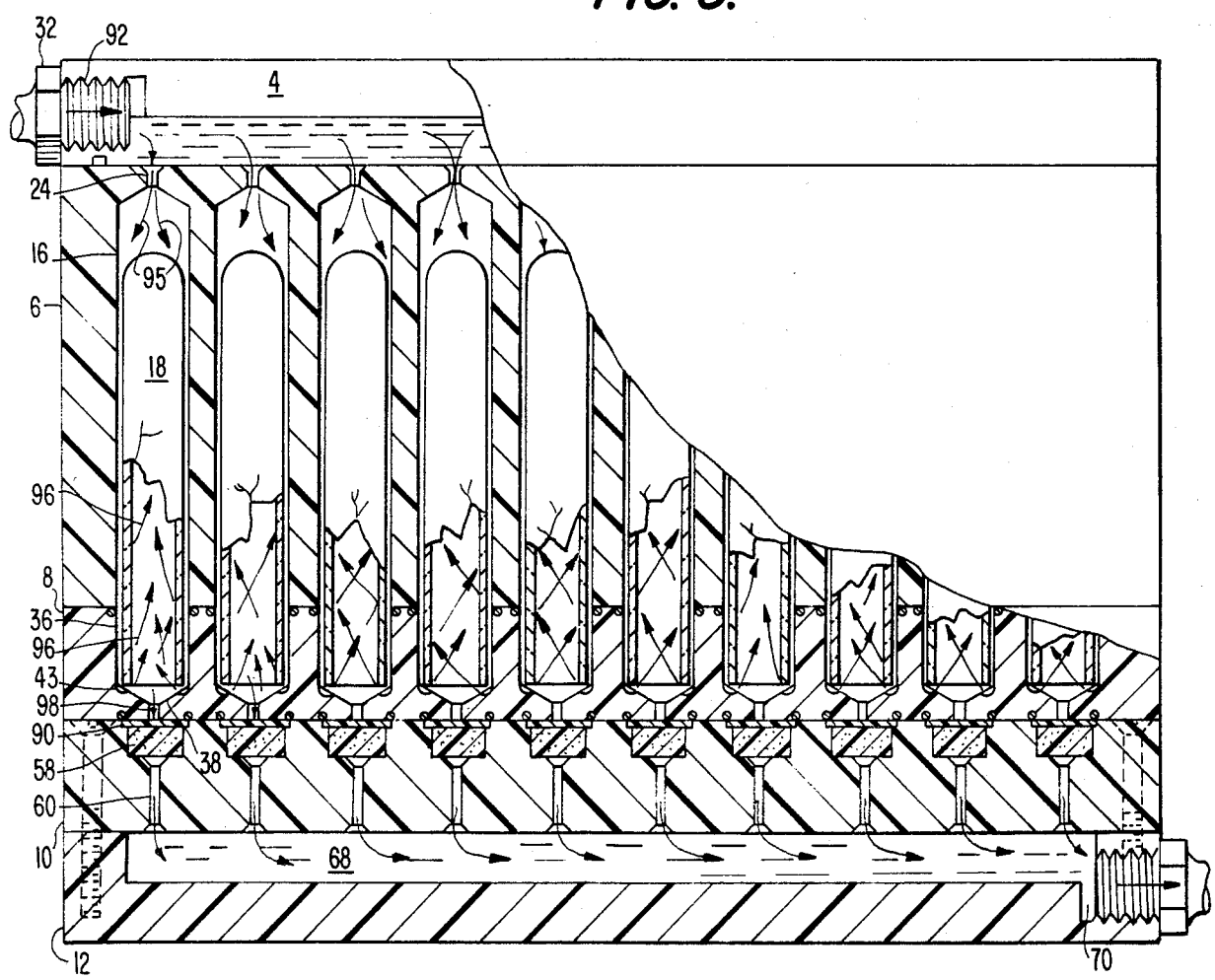
FIG. 5 is an elevational view partly in section of the novel cell harvester in the inverted position during the filtering operation.

In order to filter the contents of the test tubes the connection nipple 72 is connected to a suitable vacuum source and the valve 35 is adjusted to allow air or other fluid to be drawn through the apparatus by the vacuum. The block is designed so that when the entire filter apparatus is inverted the test tubes slide within the barrels 16 and abut the bottom conical surface 38 of the recesses 36 is illustrated in FIG. 5. In the preferred embodiment the ordinary laboratory test tubes are designed to slide in barrels 16 to prevent the formation of a seal at the bottom 20 of barrel 16 which would otherwise impede filtration and subsequent washing of the test tube. The contents of the test tubes initially flow by gravity downward to the conical surface 38 of the recesses 36.

The application of vacuum then draws the contents through the passage 44 and through the circular filter elements 90. The solids contained in the sample are collected on the filter elements 90 while the filtrate passes through the filter elements and filter screens 58. The filtrate is eventually drawn through the passages 60 in the base manifold 10 and the channel 68 in the vacuum base 12 where it exits through the outlet 70 where it is collected as desired downstream in a suitable trap.

As soon as the entire contents of the test tubes have been drawn through the filter elements 90 the valve 35 is adjusted to stop the flow of air or other fluid through the apparatus and to introduce a suitable wash solution. The wash solution is drawn by the vacuum through the connection 32 as shown by arrow 92 in FIG. 5. The wash solution continues to flow through the chambers 30 and downward through the passages 24 to the barrels 16 as shown by arrows 95.

The test tubes 18 are loosely fitted within the barrels 16 allows the wash solution to be drawn downward between the wall of the barrel and the outer surface of the test tube toward the conical shaped bottom 38 of the recesses 36 in the vacuum manifold 8. A portion of the wash solution will flow over the depressions 43 in the conical bottom 38 such that the wash solution will be diverted upward to the interior of the test tubes 18 as shown by arrows 96. This enables any residue of the sample retained in the test tubes to be recovered without having to disassemble the apparatus and remove the test tube and manually add a wash solution to each test tube.

The wash solution within the test tubes containing the recovered residue is then drawn downward through the passage 44 in a manner similar to the samples as heretofore described and indicated by arrow 98. The wash solution is drawn through the filter elements 90 and the filter screens 58 with the solids contained in the residue being deposited on the filter element.

The wash solution continues to be drawn through the filter element 90 for a predetermined period of time to remove any soluble contaminants contained within the collected sample and to remove any traces of the carrier solution of the sample. The wash solution then passes through the passages 60 in the base manifold 10 to the channel 68 in the vacuum base 12 and exits the apparatus through the outlet 70. If desired the wash solution may be collected in a suitable trap located downstream.

The cell harvester of the present invention is the product of an etensive research investigation resulting an apparatus that has been carefully engineered to include features to insure proper flow of both air and wash solution through the apparatus during the filtering operation. These features include the guide pins 74 to provide proper alignment of the test tube block 6, the vacuum manifold 8 and the base manifold 10. Other features which insure proper flow characteristics of the sample and the wash solution include a chamfered edge 94 of the passage 24, the conical shaped bottom 38 of the recess 36 in the vacuum manifold 8, the depressions 43 in the conical bottom 38, and the chamfered edges 64, 66 at both ends of the passage 60 in the base manifold 10.

At the completion of the filtering and wash operation the vacuum source is disconnected and the assembly returned to the upright position. The vacuum base and base manifold assembly is removed from the base manifold and positioned with the recesses 54 facing upward. The circular filter elements 90 cut from the filter medium which has been pressed against the filter screen by the vacuum manifold and the O-rings 48 tend to remain in place on the shelf 56 of the recess 54 when the components are disassembled.

Figure 3:
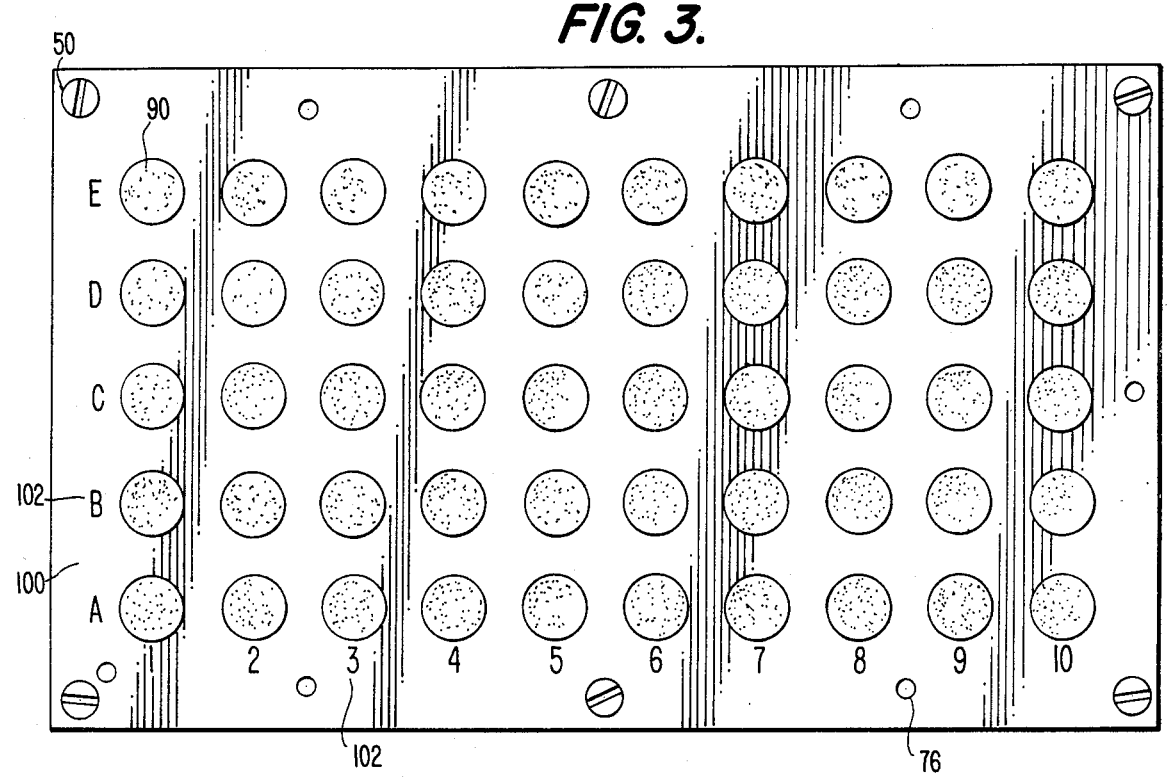
FIG. 3 is a plan view of the base manifold taken along line 3—3 of FIG. 2.

As illustrated in FIG. 3 the inner surface 100 of the base manifold 10 is provided with an indicia 102 to identify columns and rows of each recess 54. This indicia allows proper identification and cataloging of each collected sample and their source. In an alternative embodiment the upper surface 20 of the test tube block 6 may also be provided with a corresponding means to identify each test tube. As desired the individual filter elements 90 containing the collected samples can be removed from the base manifold and subjected to further testing, treatment or analysis.

The cell harvester according to the present invention enables the operator to prepare a large number of samples and simultaneously recover the desired constituents rapidly and easily without the burden of handling numerous filtering elements for each sample and without the need to transfer each sample to a separate or specially designed filtering well. While the disclosed embodiment contains 50 barrels for receiving the test tubes any desired number of barrels may be incorporated within the device as long as the distance and isolation of the test tubes are maintained in accordance with the present invention. Additionally any number of samples may be filtered with the unloaded barrels being left empty without hindering the effectiveness or increasing the burden of handling the apparatus.

The detailed description of the invention is provided primarily for purposes of illustrating the preferred embodiment of the invention. It will be recognized by those skilled in the art that the preferred embodiment is not intended that the present invention be limited to the particular structures preferred embodiments and methods of operation set forth above as they may be readily modified by those skilled in the art. It will be further readily apparent to those skilled in the art that numerous other modifications not mentioned here can still be made without departing from the spirit and scope of the invention as claimed in the following claims.

What is claimed is:

1. A method for the simultaneous filtering of the contents in a plurality of sample containers using a device comprising:
    (a) a support means having a bottom side and means defining a plurality of vertical barrels having a bottom portion, said support means further including means defining a passage from said bottom portion to an inlet means;
    (b) first manifold means complementary with said support means and barrels to define a plurality of enclosed chambers, said first manifold means including means to define a plurality of first passages extending through said first manifold and in communication with said chambers;

(c) means for forming a substantially tight seal around said barrels between said first manifold means and support means to define a plurality of sealed chambers;

(d) second manifold means complementary with said first manifold means and having means defining a plurality of second passages complementary with said first passages;

(e) means for forming a substantially tight seal between said first and second manifold means around said first and second passage;

(f) said method including the steps of inserting filter means between said first and second manifold means;

(g) positioning at least one sample container in said barrels;

(h) positioning and clamping said first and second manifold means onto said support means;

(i) applying a vacuum to said second passage;

(j) inverting said device including filter means;

(k) collecting solids of said sample container onto said inverted filter means; and (l) removing said filter means.

2. The method according to claim 1 wherein said means for forming a seal is an annular gasket and wherein the contents of each container is confined to an area on the filter means surrounded by said gasket.

3. The method according to claim 1 wherein said second manifold means include a plurality of recesses communicating with said second passages, said gasket being urged toward an edge of said recesses whereby said filter means is cut into filter elements corresponding to said recesses.

4. A filtration device for recovering substances suspended in a plurality of liquid samples comprising:

(a) support means comprising an array of substantially vertical barrels having conical shaped bottom portions converging to an apex for receiving sample containing elements and means defining passages in said support means communicating said apex with an inlet means;

(b) first manifold means complementary with said support means and having means defining a plurality of first passages extending through said first manifold communicating with said sample containing elements;

(c) second manifold means complementary with said first manifold means and having means defining second passages adapted to be connected to a vacuum source and to communicate with said means defining first passages of said first manifold means;

(d) filter means disposed between said first and second manifold means: and (e) means to removably attach said first and second manifold means and said filter means to said support means.

5. The filtration device as in claim 4 wherein said support means further comprises a base having means defining a channel communicating with said means defining passages in said support and said inlet means.

6. The filtration device as in claim 5 wherein said support means further comprises sealing means between said support means and base.

7. The filtration device as in claim 5 wherein said inlet means includes means for supplying a wash to said channel and barrels.

8. The filtration device as in claim 4 wherein said barrels are slightly larger in diameter than said sample containing elements whereby said elements fit loosely within said barrels.

9. The filtration device as in claim 4 wherein said first manifold means incudes a lower face and means defining a plurality of first recesses on said lower face arranged coaxially with said means defining first passages.

10. The filtration device as in claim 9 wherein said means defining first recesses are complementary with said barrels and are essentially the same width as said barrels.

11. The filtration device as in claim 9 wherein said means defining first recesses have conical shaped bottoms converging to an apex and essentially vertical side walls.

12. The filtration device as in claim 9 wherein said means defining first recesses include fluid deflecting means.

13. The filtration device as in claim 12 wherein said fluid deflecting means comprises at least one means defining a depression on said conical shaped bottom of said recess.

14. The filtration device as in claim 9 wherein said means defining recesses further comprise a shelf portion and sealing means retained on said shelf portion.

15. The filtration device as in claim 14 wherein said sealing means comprise an annular gasket member.

16. The filtration device as in claim 4 wherein said first manifold means includes an upper surface having means to define a filter area on said filter means surrounding said first passages.

17. The filtration device as in claim 16 wherein said means to define a filter area is annular.

18. The filtration device as in claim 17 wherein said means to define a filter area is an annular seal received in an annular groove surrounding said means defining first passages on the upper face of said first manifold and adapted to be pressed against said filter means.

19. The filtration device as in claim 4 wherein said second manifold means comprises a base manifold wherein said means defining second passages terminate at means defining a recess within a bottom face of said base manifold, said means defining a recess being complementary with said first passages.

20. The filtration device as in claim 19 further comprising a porous filter screen in said means defining recesses in said base manifold.

21. The filtration device as in claim 19 wherein said second manifold further comprises a vacuum base having means defining a channel connecting said means defining second passages to said vacuum source.

22. The filtration device as in claim 21 wherein said vacuum base includes means for supplying a vacuum to said means defining a channel in said vacuum base.

23. The filtration device as in claim 21 wherein said means defining said recess in said base manifold includes a chamfered bottom portion contiguous with said means defining a second passage.

24. A filtration device for recovering substances suspended in a plurality of liquid samples comprising:

(a) support means having a plurality of barrels adapted to receive a sample container and means to supply air or wash liquid to said barrels;

(b) manifold means supporting filter means and having a plurality of recesses complementary with said barrels defining a plurality of chambers and having means defining passages communicating with said recesses to said filter means;

(c) said recesses having substantially vertical sides and conical shaped bottom;

(d) means to apply a vacuum to said means defining passages in said manifold means; and (e) fluid deflecting means in said conical shaped bottom of said recesses comprising a pair of semispherical diametrically opposed depressions on said bottom whereby a portion of said wash liquid is directed into said sample container to wash the interior of said container.

25. A filtration device for recovering substances suspended in a plurality of liquid samples comprising:

(a) support means having means defining a plurality of barrels adapted to receive sample containing elements;

(b) first manifold means complementary with said support means and barrels to define a plurality of closed chambers, said first manifold means including means to define a plurality of first passages extending through said first manifold and in communication with said chambers;

(c) sealing means on said first manifold means surrounding each of said first passages between said first manifold means and support means to seal said plurality of closed chambers;

(d) second manifold means complementary with said first manifold means and having means defining a plurality of second passages complementary with said first passages and communicating said first passages with a vacuum source;

(e) filter means disposed between said first and second manifold means;

(f) means to apply a vacuum to said second passages;

(g) means to alternatively supply air or wash to said barrels; and (h) means for forming a substantially tight seal between said first and second manifold means around said first and second passages.

26. The filtration device as in claim 25 wherein said means for forming a seal between the first and second manifold means comprises an annular gasket member and defines a filter area on said filter means, said gasket being received in an annular groove surrounding said first passage on the upper face of said first manifold.

27. The filtration device as in claim 26 wherein said second manifold means includes a plurality of annular shaped recesses disposed in a lower face complementary with said first manifold means and communicating with said means defining second passages, said recess having cutting means abutting said annular gasket to cut said filter means into filter elements corresponding to an edge of said recess by the application of sufficient force by said gasket.

28. The filtration device as in claim 27 comprising a latching member to secure said first and second manifold means to said support and wherein said cutting means is an edge of said recess said latching member capable of supplying sufficient force whereby said gasket is urged toward said edge of the recess to cut said filter means disposed between said first and second manifold means.

* * * * *